United States Patent [19]

Pippert

[11] Patent Number: 4,672,768
[45] Date of Patent: Jun. 16, 1987

[54] FISHING LURE

[75] Inventor: Aaron J. Pippert, Houston, Tex.

[73] Assignee: Utex Industries, Inc., Houston, Tex.

[21] Appl. No.: 822,748

[22] Filed: Jan. 27, 1986

[51] Int. Cl.4 .............................................. A01K 85/00
[52] U.S. Cl. ................................. 43/42.09; 43/42.24
[58] Field of Search ................ 43/42.24, 42.28, 42.35, 43/42.36, 42.37, 42.38, 42.39, 42.09, 42.10, 42.11, 42.12, 42.13, 42.14, 42.15, 42.16, 42.17, 42.18, 42.19, 42.53

[56] References Cited

U.S. PATENT DOCUMENTS

| | | | |
|---|---|---|---|
| 2,275,253 | 3/1942 | Eger | 43/42.53 |
| 2,817,922 | 12/1957 | Takeshita | 43/42.37 |
| 3,203,132 | 8/1965 | Kotis . | |
| 3,289,345 | 12/1966 | Reininger et al. . | |
| 3,611,614 | 10/1971 | Ward | 43/42.24 |
| 3,863,378 | 2/1975 | Walker | 43/42.28 |
| 3,971,152 | 7/1976 | Husson, Jr. . | |
| 4,123,870 | 11/1978 | Wiskirchen | 43/42.37 |
| 4,167,076 | 9/1979 | Weaver | 43/42.36 |

Primary Examiner—M. Jordan
Attorney, Agent, or Firm—Browning, Bushman, Zamecki & Anderson

[57] ABSTRACT

An improved fishing lure is formed by a head/hook member having integral projections which interengage in preformed bores of a profiled body member of resilient material so as to maintain the unitary integrity of the assembly. The head/hook member is preferably a unitary member of relatively dense material, such as metal, so as to provide the necessary ballast for the lure. The body member is preferably formed of a resilient material, such as plastics or rubber like material, and as any geometric configuration, including the natural form of normal fish prey and may be colored in accordance with any coloration scheme. The body member has preformed bores which receive portions of the head/hook member therein without damage to the body member providing ease of assembly and replaceability not heretofore possible.

11 Claims, 5 Drawing Figures

U.S. Patent   Jun. 16, 1987   4,672,768
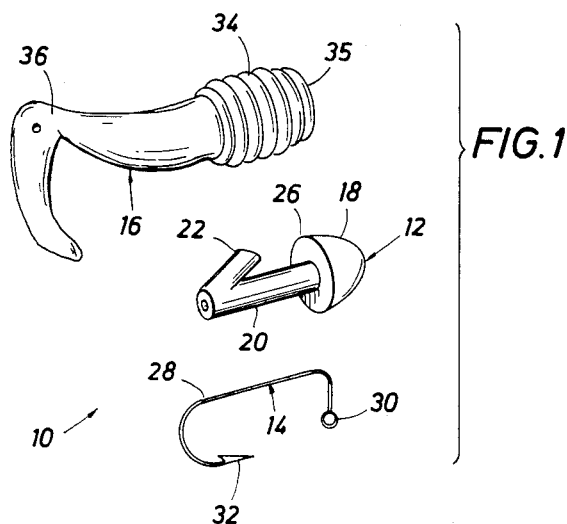
FIG.1
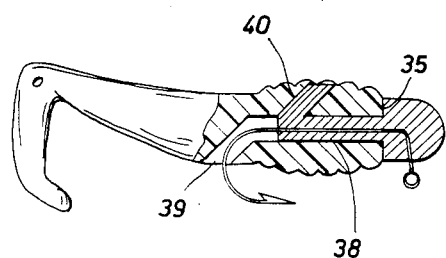
FIG.2
FIG.4
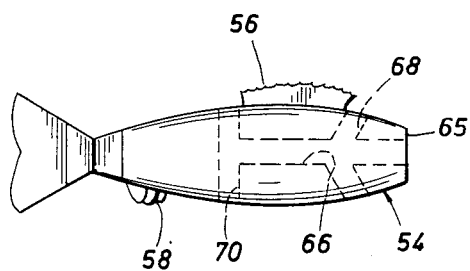
FIG.3
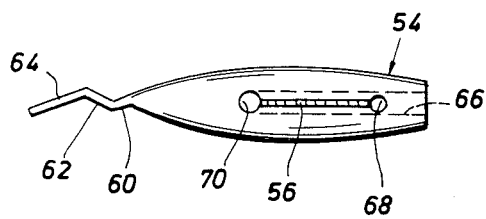
FIG.5

FISHING LURE

BACKGROUND OF THE INVENTION

1. The Field of the Invention

The present invention relates to an improved fishing lure.

2. Description of the Prior Art

Fishing lures have traditionally been made either of hard or rigid materials, such as metal or hard plastic or of a resiliant material such as plastic or rubber. The resilient materials are preferred by many fishermen because of the versatility in shape and coloration and more natural action of the lures, due to their flexibility. For example, lures of resiliant materials can be made to similate the natural prey of fish, such as worms, shrimp, shad, lizard or small bugs, and they also can be appropriately colored. Alternatively, the resilient materials may be made of a highly attractive color and have any geometric configuration. They are relatively inexpensive to produce. The metal lures, in contradistinction, are generally formed only in a geometric configuration known as a "spoon". These metal lures must then generally be colored, for example, by lacquering, or treated to stay shiny so as to attract the attention of the fish.

While each of these types of lures is well known for its advantages, they have their respective disadvantages. The flexible plastic lures are generally rather light in weight (low mass) and therefore are difficult to cast to achieve any distance and degree of accuracy in lure placement. They tend to rise towards the surface as they are pulled through the water and thus may not stay at a depth suitable for attracting fish. They also lack strength and may be torn apart by a partial strike or by encountering a submerged snag. The metal lures, on the other hand, have the necessary strength and weight (high mass) but lack variety and realism in shape, color and action.

There have been many attempts to deal with the above described deficiencies of the prior art. U.S. Pat. No. 3,203,132 to Kotis describes a lure in which a metal plate is intergally molded into a body of resilient plastic or rubber material. The advantage of the Kotis lure is that the line and hook can be attached to the metal plate, which provides both the strength and weight for the lure, while the resilient body can have the desired configuration and/or coloring. The primary disadvantage of the Kotis lure is that it is quite expensive to manufacture and, should the body portion be damaged in any way, it is irreplaceable.

U.S. Pat. No. 3,289,345 to Reininger et al concerns modifying a spoon lure by providing a sleeve or covering over it. However, this sleeve merely covers the metal spoon with a thin-walled member to achieve the coloration or to maintain the shininess as desired. The shape and weight are determined by the existing lure.

A third type of lure is a two-part assembly, one part being a weighted head/hook member and the other a flexible body of plastic or rubber material. These are available in three styles, namely a permanently assembled head/hook member and flexible body, a factory assembled head/hook member and flexible body, and a kit of a head/hook member and one or more flexible bodies. The first style has the previously mentioned disadvantage of being incapable of being repaired should the flexible body be damaged by a partial strike or the like. The second style has the problem of the lure body tending to separate from the head/hook member during service and causing major problems. The third style has the problem of inserting the hook through the body with sufficient care to end up with a satisfactory looking lure that would compare to a factory assembled lure. The lure bodies of such kits are solid (and often opaque) and have no means to assist one in properly inserting a hook into the body. It is very easy to result in a misassembly with the body not meeting the head and/or the hook extending asymmetrically from the side of the body.

SUMMARY OF THE INVENTION

The present invention provides an improved fishing lure in which the integrity of the lure configuration is assured. It has both the weight and strength characteristics of an all-metal lure while having the versatility of coloration, shape and action of a plastic or rubber lure. The present lure has a head/hook member formed of rigid, dense material defining a head, a shaft and at least one stud spaced from the head and extending laterally outwardly from the shaft. The shank portion of a fish hook is fixed extending axially through the shaft with the curved barb extending from the rear of the shaft and the eyelet extending from the head. A body member of resilient material defines a preformed first bore, a preformed second bore intersecting the blind first bore spaced from the entry end thereof, and at least one preformed stud receiving third bore intersecting the first bore. The present invention is thus distinguished from the prior art by having a body member of highly resilient material with preformed bores therein which is capable of maintaining structural integrity with a head/hook member in normal fishing situations. The body material is readily deformable by finger pressure alone and thus, together with the preformed bores, aid in the proper insertion, guiding and positioning of the hook without damaging the body member. A particular advantage of the present invention is the coupling of the resilient body member in such a manner as to maintain the integrity of the lure as well as good appearance and functionality.

BRIEF DESCRIPTION OF THE DRAWING

The present invention will now be described by way of example with reference to the accompanying drawings in which:

FIG. 1 is an exploded rear perspective view of the components of the present invention;

FIG. 2 is a side elevation, partially in section, of a lure according to the present invention;

FIG. 3 is a front perspective view of an alternate embodiment of the head hook member of a lure in accordance with the present invention;

FIG. 4 is a side elevation of an alternate embodiment of the body member according to the present invention; and FIG. 5 is a top plan view of the body member of FIG. 4.

DETAILED DESCRIPTION OF THE PRESENT INVENTION

The subject lure 10 is formed by a head/hook member 12, a hook 14 and a body member 16. The configurations of the head/hook member 12 and body member 16 are for illustrative purposes only. Clearly, both members can be made in a wide variety of shapes and sizes without departing from the spirit or essential characteristics of the present invention.

The member 12 is metallic having a head 18, a shaft 20 and a stud 22 extended radially outwardly from the shaft 20. The head 18 has an outer profile which is shown with a forwardly directed smooth surface of transition providing a streamlined appearance for ease of movement of the lure through the water. The head 18 terminates at a rearwardly directed annular shoulder and base 26 of a first diameter. The shaft 20 has a second diameter smaller than the first diameter. The stud 22 is spaced from the head 18 and extends radially from the shaft 20 a distance generally not greater than the first diameter. The stud is preferably inclined toward the head 18, but in no case is at an angle greater than normal to the axis of the shaft 20. The hook 14 is a conventional single tine hook having an elongated shank 28 with an eyelet 30 on one end and a curved barb 32 on the opposite end. The member 12 is preferably lead cast on the shank of the hook 14.

The body member 16 is formed from resilient material and can have any desired configuration or coloration. In the illustrated instance the member 16 is shown with a worm-like configuration including a body portion 34 and tail 36. The tail 36 is rather thin in cross section so as to cause a fluttering motion when the lure is played in the water. The body portion 34 is generally cylindrical and defines a front face 35, a preformed first bore 38, a preformed second bore 39 intersecting the first bore spaced from the face end thereof, and a third bore 40 intersecting the bore 38 spaced from face 35. The second bore 39 can either be curved, as shown, or straight and preferably is of a smaller diameter than the first bore. The third bore 40 is preferably angled toward the face 35 of the body member 16 and in no case is more than normal to the axis of the first bore. The first bore has a diameter to receive the shaft 20, the second bore a diameter to pass the barb 32 and the third bore a diameter to engage stud 22.

The subject lure is assembled by joining the head/hook member 12 and body member 16. The body member is sufficiently flexible that finger pressure alone will distort it sufficiently for the curved barb 32 to pass through the first and second bores without damaging the body member material. The shaft 20 of the member 12 is received in the preformed first bore 38 of the body member with stud 22 being received in third bore 40. Again, the body member is readily distorted to allow stud 22 to pass through the first bore 38 without causing damage. The barbed end 32 of hook 14 extends rearwardly through the second bore to extend beneath the lure. It will be appreciated from FIG. 2 that the lure will maintain its structural integrity, even if the tail 36 should receive a partial strike or become snared or an underwater obstruction. It would take a substantial amount of force to separate the body member from the head/hook member. The preformed bores also assure that the lure will be properly assembled and that assembly and disassembly can be accomplished without damage to the body member 16.

It is important to the proper functioning of the present invention that the body be molded of a material having a "rubbery" texture, such as flexible elastomeric materials, polyvinyl chloride, vinyl plastisol, and the like. The resiliency of the material allows it to be deformed and stretched by finger pressure alone so that the hook barb 32, shaft 20 and studs 22 can be inserted into and withdrawn from the respective preformed bores without damage to the body member 16. The resiliency of the material also serves to give the lure a more realistic action as the lure is drawn through water.

FIG. 3 shows an alternate embodiment of the head/hook member of the present invention. In this instance the member 42 is likewise formed of metal or other dense material and has a head portion 44 illustrated with an outer surface of smooth transition forming a streamlined, forwardly directed profile and terminating at a rear shoulder and base 46 of a first diameter. A shaft 48 of a second smaller diameter extends rearwardly from the base 46 and has two studs 50, 52 spaced from the head 44 and extending radially from the shaft 48 a distance generally not greater than the diameter of the shoulder 46. The studs preferably are inclined toward the head, but in no case are at an angle greater than normal to the axis of the shaft. The studs also can have any relative angular spacing between them as may be desired to accommodate the companion body member. As with the previous embodiment, the member 42 receives a hook 14 therein. It should here be pointed out that the member 42 preferably is cast from a material such as lead.

As with the preferred embodiment, this member is inserted into a body member (FIG. 4) by deforming the body member sufficiently for the hook barb and studs to pass through the first bore to extend through and engage in second and third bores, respectively.

An alternate embodiment of the body member is shown in FIGS. 4 and 5 and would receive a head/hook member of FIG. 3. This body member 54 has a fish-like outer profile including fins 56, 58 and a tail formed of angularly oriented sections 60, 62, 64, which can be fixed or articulated as desired to achieve the particular motion of the lure. As with the previous embodiment, the body member is provided with a front face 65, a preformed first bore 66, a preformed second bore 70 intersecting the end of first bore 66 remote from face 65, and oppositely directed preformed third bores 68 intersecting the first bore spaced from the face 65. The third bores 68 are spaced from the entry of the blind bore 66 a distance equal to the spacing between the studs and shoulders of a corresponding body member.

The present invention may be subject to many modifications and changes without departing from the spirit or the essential characteristics thereof. For example, the size, configuration and weight of the head/hook member may be varied and/or the body member may have any configuration or geometric shape or simulate natural prey of fish, and the coloration may be natural or any iridescent shade, as well as fluorescent, luminous, single or multi-colored, flake modified and the like.

What is claimed is:

1. A body adapted to be repeatedly mounted on and dismounted from a head/hook member of a two-piece fishing lure, said body comprising:

an integral member molded of flexible material and having a major axial dimension and an outer profile defining the exterior characteristics of the lure and an end face, a pre-formed first bore extending inwardly from said face at least partly through said body parallel to the major axis thereof, a preformed second bore extending substantially normal to and intersecting said first bore at a point spaced from said end face, and at least one preformed third bore spaced from said end face and intersecting said first bore.

2. A body according to claim 1 wherein said flexible material provides sufficient resiliency to allow said body to be readily deformed by finger pressure whereby a cooperating member can be inserted into and withdrawn from said body without damage to said body.

3. A body according to claim 1 wherein said second bore is straight.

4. A body acording to claim 1 wherein said second bore is curved.

5. A body according to claim 1 wherein said third bore is inclined toward said face.

6. A body according to claim 1 wherein the diameter of said first bore is only a minor portion of the overall diameter of said body.

7. A fishing lure adapted for repeated assembly and disassembly on site, said lure comprising:

an integral head/hook member of rigid dense material defining a head portion having an external forwardly directed profile ending at a rearwardly directed shoulder in a base of a first diameter and a shaft of a smaller, second diameter extending rearwardly from said base with at least one stud extending radially from said shaft spaced a first distance from said base, said head/hook member enclosing at least a portion of the shank of a fishing hook leaving the eyelet and barbed hook extending from the front and rear ends, respectively, thereof; and an integral lure body molded of flexible material and having a major axial dimension and an outer profile defining the exterior characteristics of the lure and an end face, a pre-formed first bore extending from said end face at least partly through said body parallel to the major axis thereof, a pre-formed second bore opening into said body at an angle to said first bore and intersecting said first bore at a point spaced from said end face, said first and second bores having diameters sufficiently small to guide said hook from said first bore into and through said second bore and at least one pre-formed third bore intersecting said first bore spaced said first distance from said end face;

said shaft being received in said first bore with said barbed hook extending through said second bore and each stud being received in a respective third bore.

8. A fishing lure according to claim 1 wherein said body member is formed of elastomeric-like materials providing sufficient resiliency to allow said body member to be readily deformed by finger pressure whereby said shaft, barbed hook and studs can be inserted into and withdrawn from said first, second and third bores, respectively, without damage to said body member.

9. A fishing lure according to claim 1 wherein said head/hook member has a plurality of studs extending radially from said shaft in an array.

10. A fishing lure according to claim 1 wherein said studs are inclined toward the forwardly directed profile.

11. A fishing lure according to claim 1 wherein said preformed first bore is dimensioned to receive said shaft therein in close fit.

* * * * *

UNITED STATES PATENT AND TRADEMARK OFFICE
CERTIFICATE OF CORRECTION

PATENT NO. : 4,672,768

DATED : June 16, 1987

INVENTOR(S) : Aaron J. Pippert

It is certified that error appears in the above-identified patent and that said Letters Patent is hereby corrected as shown below:

In Column 6, line 15, delete "1" and insert therefor --7--.

In Column 6, line 22, delete "1" and insert therefor --7--.

In Column 6, line 25, delete "1" and insert therefor --7--.

In Column 6, line 28, delete "1" and insert therefor --7--.

Signed and Sealed this

Sixth Day of October, 1987

Attest:

DONALD J. QUIGG

Attesting Officer

Commissioner of Patents and Trademarks